United States Patent [19]
Cole et al.

[11] 3,806,196
[45] Apr. 23, 1974

[54] AUTOMATIC MUD FLAP RETRACTOR FOR REAR-DUMPING TRUCKS

[75] Inventors: Carroll R. Cole; Warren L. Ferriell, both of Decatur, Ill.; William M. Jennings, Phoenix, Ariz.

[73] Assignee: Caterpillar Tractor Co., Peoria, Ill.

[22] Filed: Dec. 14, 1972

[21] Appl. No.: 315,232

[52] U.S. Cl. .................. 298/1 SG, 280/154.5
[51] Int. Cl. ........................................ B62d 25/16
[58] Field of Search ............... 298/1 SG; 280/154.5

[56] References Cited
UNITED STATES PATENTS

| | | | |
|---|---|---|---|
| 3,203,710 | 8/1965 | Harting | 298/1 SG |
| 3,248,126 | 4/1966 | Saxton | 298/1 SG |
| 3,582,109 | 6/1971 | Moore | 298/1 SG |
| 3,165,360 | 1/1965 | Saxton | 298/1 SG |
| 3,337,238 | 8/1967 | Weasel | 280/154.5 R |
| 2,721,760 | 10/1955 | Lapham | 298/1 SG |
| 2,981,553 | 4/1961 | Zerbe | 280/154.5 |

*Primary Examiner*—Richard J. Johnson
*Attorney, Agent, or Firm*—Fryer, Tjensvold, Phillips & Lempio

[57] ABSTRACT

An automatic mud flap retractor in the form of a cable guided over sheaves and through a guide pipe mounted on the dump body, an end of the cable being fixed to the longitudinal frame member and another end being fixed to a transverse pipe member which is secured along each end portion thereof to the lower edge portion of a mud flap and which extends across the rear portion of the vehicle whereby tilting back of the dump body incident to dumping of a load causes automatic retraction or raising of the lower portion of the mud flap so as to prevent the mud flap from interfering with the ground or dumped load.

4 Claims, 9 Drawing Figures

AUTOMATIC MUD FLAP RETRACTOR FOR REAR-DUMPING TRUCKS

BACKGROUND OF THE INVENTION

This invention is related to an automatic retractor for mud flaps such as conventionally used at the rear wheels of a dump truck so as to block material such as mud thrown to the rear of the vehicle incident to wheel rotation.

The laws of many states have made the provision of mud flaps mandatory on trucks. Recently, with the passage of a federal law, the requirement has been extended to all of the states. Mandatory mud flap requirements have generated several problems, when applied to dump trucks.

Unlike fixed body vehicles, dump trucks are designed to have their dump body tilted back when dumping a load. With the usual placement of mud flaps adjacent and to the rear of the rear wheels of the vehicle on the dump body and the pivot point being forward thereof, the vertically depending mud flaps frequently touch the ground near where the load which is being dumped. In this position, the truck is frequently driven over the flaps or the flaps become embedded in the dumped materials such that the flaps are abraded, worn, or even torn.

Many devices have been developed to in some manner retract or raise mud flaps during the dumping process. For example, a number of mechanical devices such as those shown in U.S. Pat. Nos. 2,981,553, 3,248,126, and 3,582,109 have attempted to treat the problem. Unfortunately, these devices use complex mechanical components which are both costly and susceptible to breakdowns. In addition, some of the complex mechanical devices require operator actuation which is sometimes not forthcoming.

Other less complex cable devices have been developed in an attempt to provide automatic actuation. For example, U.S. Pat. Nos. 2,721,760, 3,165,360, and 3,203,710 show various cable devices wherein mud flaps are automatically raised or retracted incident to the normal tipping or pivoting of the dump body when dumping a load. With these devices, however, certain problems remain. The location of the cable mounting point on the flap being at its lower midpoint can cause the cable to become fouled with the rear wheels. Alternatively, breakage of the cable can cause nonfunction of the entire retractor mechanism. Also, breakage is enhanced by the fact that the cables are located in an unprotected manner near the rear wheels and are susceptible to being broken by rocks, thrown by the wheels, etc. Another undesirable condition with the prior art is that the mud flaps tend to twist and turn and become fouled.

SUMMARY OF THE INVENTION

The invention takes the form of a vertically hanging, flexible mud flap depending from an upper edge and positioned behind the rear wheels of a dump truck vehicle and having a cable secured to the lower portion thereof. The cable is guided over sheaves and fixed at its other end to the longitudinal frame whereby tilting of the dump body incident to dumping causes automatic retracting of the lower portion of the mud flap. More particularly, the invention includes a guide pipe member through which the cable passes intermediate a pair of sheaves so as to protect the cable from damage. Also, the invention includes an elongated, transverse pipe member interconnecting the lower edge portions of a pair of laterally separated flaps with the cable attached thereto so as to insure coupled motion of a pair of flaps.

DETAILED DESCRIPTION

Figure 1:
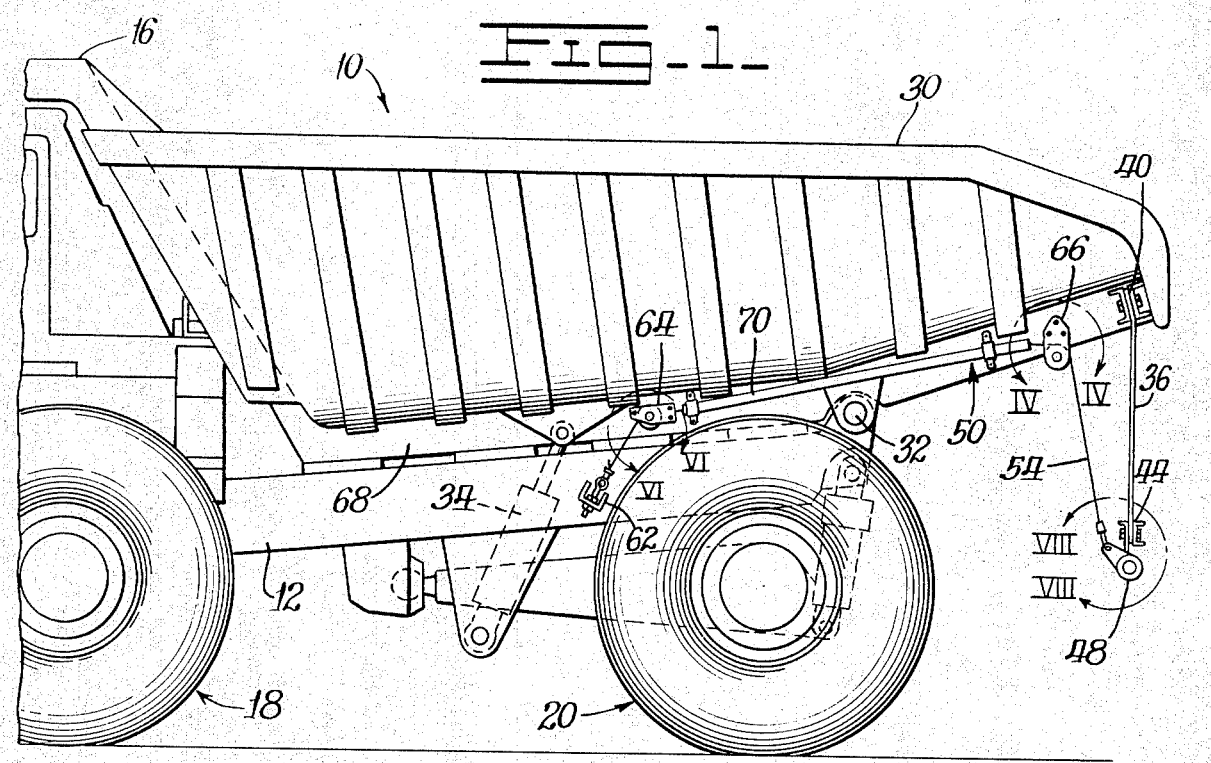
FIG. 1 is a partial side elevational view of a dump truck vehicle incorporating the subject invention.
Figure 2:
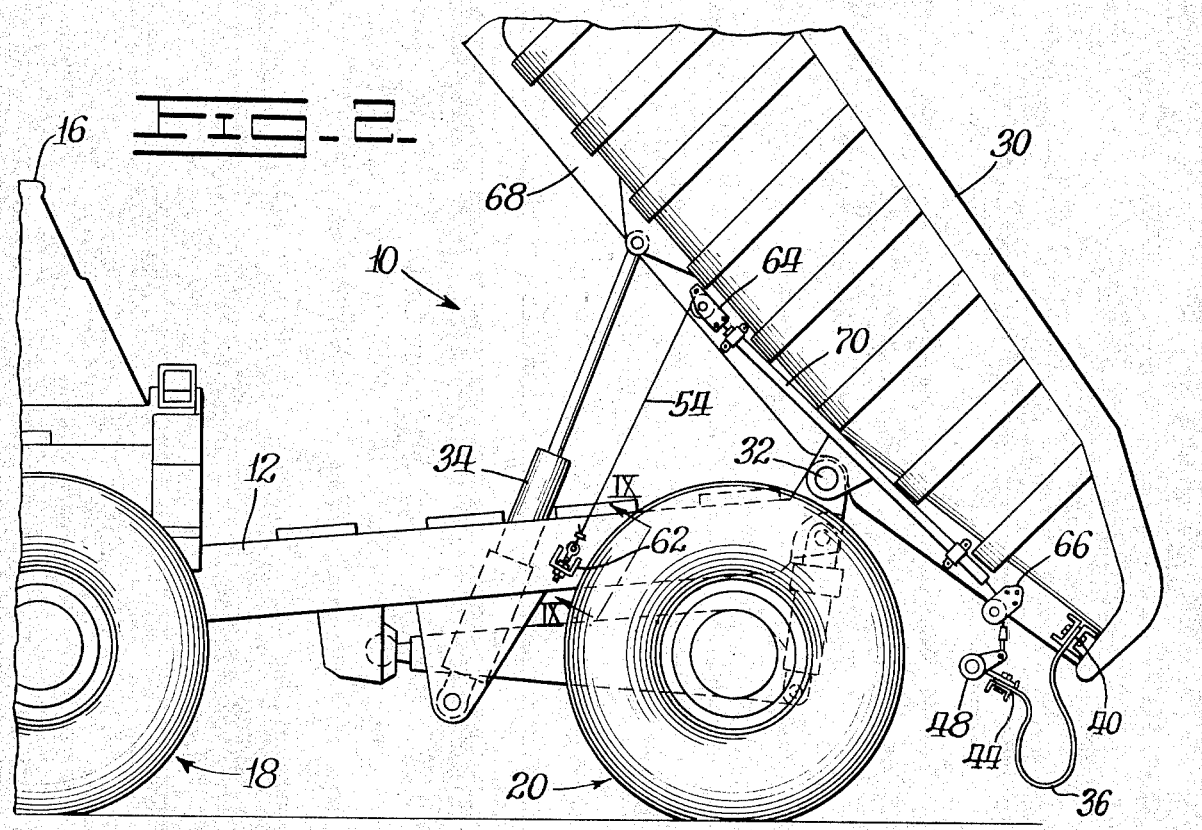
FIG. 2 is a view of the same with the dump body in its tilted position.
Figure 3:
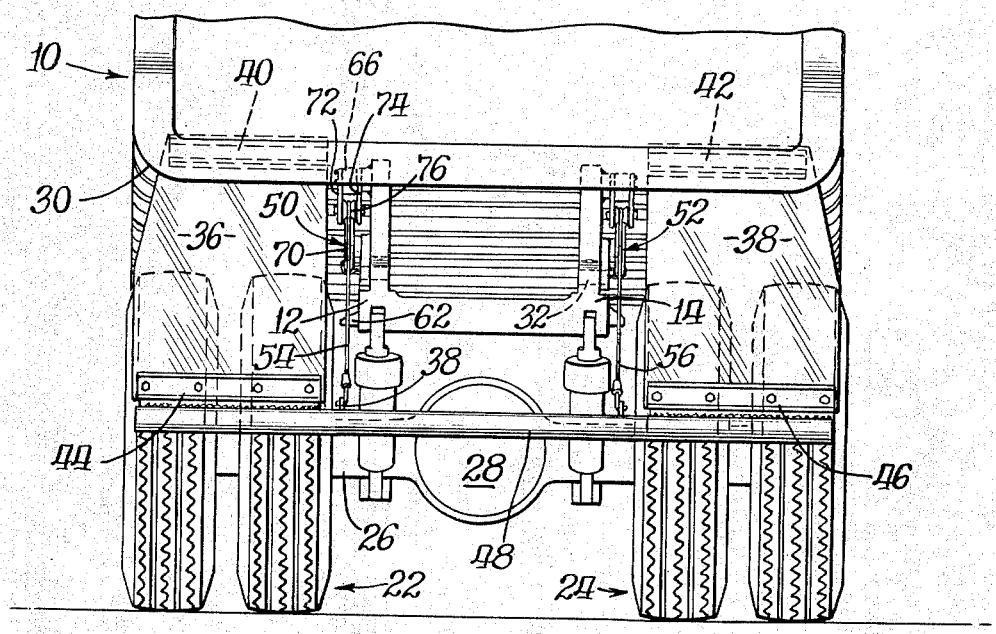
FIG. 3 is a partial elevational view of the dump truck vehicle shown in FIG. 1.

FIGS. 1–3 show generally at 10 a dump truck vehicle incorporating the present invention. The dump truck vehicle typically comprises a frame having left and right longitudinal frame members 12, 14. Mounted at the forward end of the frame member is an operator cab 16 which is mounted over the vehicle motive power means (not shown). The vehicle is driven over the ground by means of front wheels generally shown at 18 and rear wheels generally shown at 20. As best seen in FIG. 3, the rear wheels actually comprise a pair of left and right rear wheels 22, 24, mounted for rotation on a rear axle 26 having a differential housing 28 intermediately disposed between its ends.

As seen in FIGS. 1 and 2, a dump body 30 is pivotally mounted adjacent the rear end of right and left longitudinal frame members 12, 14, by pivot means 32. As seen in FIG. 2, the load bed may be tilted for dumping by means of an extensible hydraulic jack 34 which is operator actuated by control means (not shown) in the vehicle cab. Mounted at the rearward-most portion of the overhanging load bed 30 are a pair of left and right mud flaps 36, 38, which may be of flexible material such as rubber. The mud flaps are transversely spaced and are fixed to the load bed by suitable means such as bolting along their upper end portions 40, 42, respectively. Similarly mounted along the bottom end portions is a transverse pipe member 48 which extends across the back of the vehicle and having each end thereof connected to the bottom end portions 44, 46.

Figure 8:
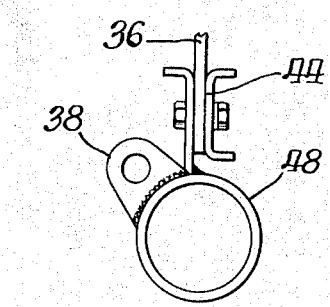
FIG. 8 is an enlarged detail of the transverse pipe member shown in VIII—VIII in FIG. 1.
Figure 9:
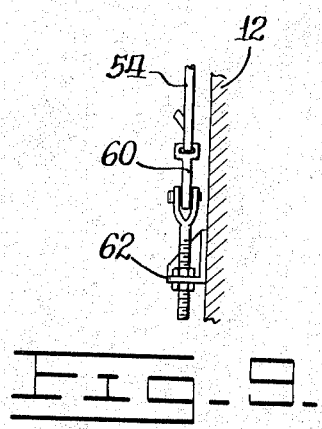
FIG. 9 is a detail of an anchor bracket taken along lines IX—IX in FIG. 2.

The retraction means for raising the mud flaps is shown generally at 50, 52. Each retraction means comprises a cable 54, 56, and means fixing the cable adjacent each end to a frame member and the lower mud flap portion. With particular reference to the left retraction means 50 and FIG. 1, the cable is affixed by one end to an attachment bracket 58 mounted on transverse pipe member 48, as best seen in FIG. 8. The other end of the cable is fastened by means of an eye bolt 60 to an anchor bracket 62 mounted on frame member 12. Forward and rear sheaves 64, 66, are mounted on a longitudinal dump body member 68, as will be more particularly described.

Intermediate the forward and rear sheaves is affixed a guide pipe member 70 through which the cable passes. The guide pipe member extends between the sheaves so as to protect the cable.

Figure 4:
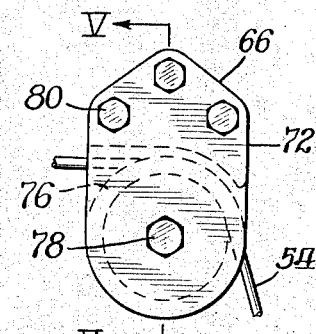
FIG. 4 is an enlarged detail of the rear sheave shown at IV—IV in FIG 1.
Figure 5:
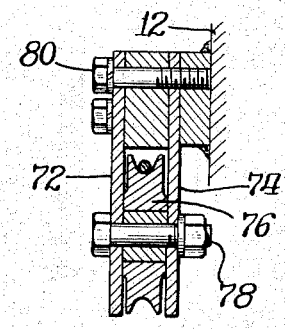
FIG. 5 is a sectional view taken along lines V—V in FIG. 4.

As best seen in FIGS. 4 and 5, a sheave comprises a pair of plate members 72, 74, having a pulley 76 over which the cable 54 passes and which is mounted on a pivot 78. A plurality of bolts 80 may be used to secure the rear sheave to the frame 12.

Figure 6:
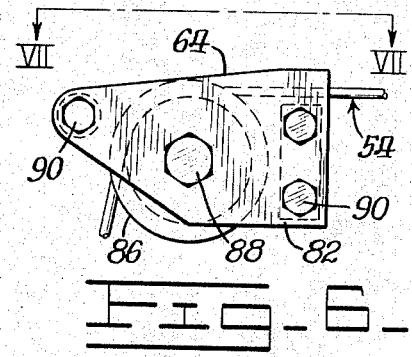
FIG. 6 is an enlarged detail of the forward sheave shown as IV—IV in FIG. 1.
Figure 7:
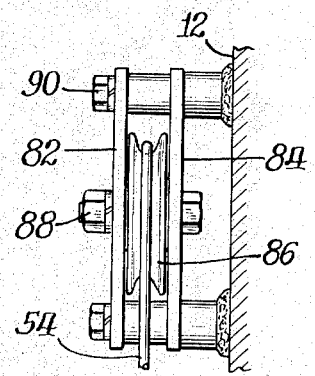
FIG. 7 is a top view taken along lines VII—VII in FIG. 6.

Similarly, the forward sheave 64, as best seen in FIGS. 6 and 7, comprises a similar pair of plate members 82, 84. A pulley 86 is pivotally mounted at 88 to support cable 54. A plurality of bolts 90 are used to mount the forward sheave to the frame 12.

As seen in FIG. 3, the cables are mounted to the transverse pipe member inward of the flaps at a point which is in line with the sheaves and guide pipes. In this matter, twisting of the flaps incident to raising of the bed to dump a load as shown is avoided. As shown, the operation is automatic whereby dumping of the load causes retraction of a lower portion of the mud flaps thereby raising the flap to be clear of the ground or a dumped load.

It is to be noted that the above description is merely illustrative of the preferred embodiment of the invention and that the scope of the invention is not to be limited thereto, but is to be determined by the scope of the appended claims.

What is claimed is:

1. In a dump truck vehicle, having a pair of laterally spaced rear wheels and a frame including longitudinally extending frame members, a dump body pivotally mounted on said frame adjacent the rear thereof,
   a vertically hanging flexible mud flap defining upper and lower edges, corresponding with each wheel pair, each mounted by its upper edge to said body,
   said mud flaps being positioned with relation to said rear wheels so as to block material such as mud thrown to the rear of the truck vehicle,
   each mud flap having a cable defining a first and a second end,
   means securing the first end of said cable to said mud flap comprising
   an elongated member defining first and second ends, said elongated member being fixed to a respective mud flap along each end portion thereof,
   means securing the second end of said cable to said longitudinal frame member, and
   cable guide means on said body for guiding said cable intermediate its ends whereby tilting of said body incident to dumping causes automatic retracting of the lower portion of said mud flap.

2. The invention of claim 1 wherein the elongated member is a pipe extending between the respective mud flaps across the rear of the vehicle.

3. The invention of claim 1 wherein said cable guide means comprise forward and rear sheaves mounted on longitudinally spaced relation along said frame member.

4. The invention of claim 3 wherein said guide means further comprise a pipe mounted intermediate said forward and rear sheaves, said pipe defining an opening through which the cable is guided.

* * * * *